United States Patent [19]
Jackson et al.

[11] Patent Number: 6,129,252
[45] Date of Patent: Oct. 10, 2000

[54] VERTICAL SHOTGUN OR RIFLE MOUNT FOR HUNTING BOATS AND THE LIKE

[76] Inventors: Clayton R. Jackson; Randy J Sauerwein, both of 3540 Hwy. 206, Columbia Falls, Mont. 59912

[21] Appl. No.: 09/159,029

[22] Filed: Sep. 23, 1998

[51] Int. Cl.[7] .................................................. B60R 9/00
[52] U.S. Cl. .................... 224/406; 114/351; 114/364; 211/64; 224/545; 224/571; 224/913
[58] Field of Search .................................. 224/406, 42.33, 224/42.38, 543, 545, 547, 558, 565, 566, 571, 913, 916; 211/60.1, 64; 114/351, 364

[56] References Cited

U.S. PATENT DOCUMENTS

| | | |
|---|---|---|
| 3,638,257 | 2/1972 | Ernst ........................................ 114/351 |
| 3,876,078 | 4/1975 | Gomes . |
| 3,952,878 | 4/1976 | Gorham . |
| 4,057,180 | 11/1977 | Whittaker ................................ 224/282 |
| 4,089,423 | 5/1978 | Gorham . |
| 4,144,971 | 3/1979 | Balibrea . |
| 4,159,588 | 7/1979 | Pfeiffer . |
| 4,919,316 | 4/1990 | Grauberger ............................. 224/406 |
| 4,936,531 | 6/1990 | Bauser ................................ 224/42.11 |
| 5,078,279 | 1/1992 | Hancock . |

FOREIGN PATENT DOCUMENTS 2170994 of 1986 United Kingdom .

Primary Examiner—Stephen P. Garbe
Assistant Examiner—Maerena W. Brevard
Attorney, Agent, or Firm—John D. Lister

[57] ABSTRACT

A vertical shotgun or rifle mount for hunting boats and the like includes a mounting bracket for holding a shotgun or rifle in a substantially vertical position with a muzzle of the shotgun or rifle pointing upward. The mounting bracket includes a first retaining means adjacent the base of the mounting bracket for receiving and holding the butt end of a shotgun or rifle stock and maintaining the butt end of the shotgun or rifle stock above the bottom of a boat and a second retaining means adjacent the upper end of the mounting bracket means for receiving and holding the receiver of a shotgun or rifle. The mounting bracket has a clamp or other securement device for securing the mounting bracket to the side of a hunting boat with the base of the mounting bracket above the bottom of the hunting boat and the upper end of the mounting bracket projecting above a gunnel of the side of the hunting boat less than twelve inches.

10 Claims, 3 Drawing Sheets

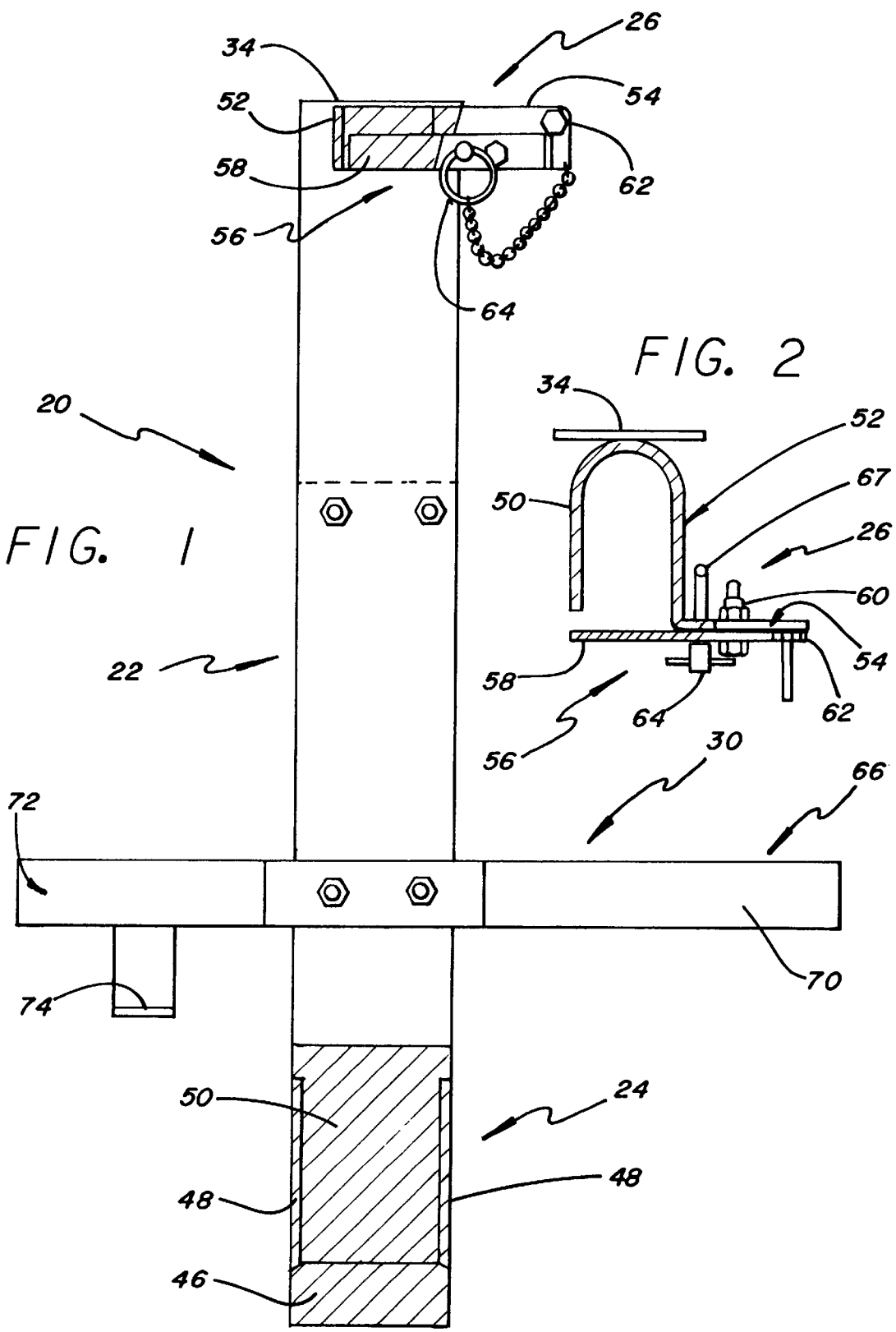

VERTICAL SHOTGUN OR RIFLE MOUNT FOR HUNTING BOATS AND THE LIKE

BACKGROUND OF THE INVENTION

The present invention relates to a vertical shotgun or rifle mount and, in particular, to a vertical shotgun or rifle mount for use in hunting boats which: (a) holds a shotgun or rifle in a vertical position with the muzzle of the shotgun or rifle pointing upward to prevent injury due to accidental discharge; (b) maintains the butt end of the shotgun or rifle stock above the bottom of the boat so that the stock does not get wet; (c) projects only a limited distance above the gunnel (gunwale) of the hunting boat so that the mounting bracket does not get in the way of the hunter when the hunter is moving the shotgun or rifle about to hunt; and (d) keeps the shotgun or rifle from getting lost if the hunting boat capsizes.

Hunting for water fowl, such as but not limited to duck hunting, is frequently carried out from within a hunting boat. While hunting boats may have other configurations, typically, hunting boats are flat bottomed boats with shallow side walls about thirteen inches in height. Over the years, there has been a need: for carrying shotguns or rifles in such boats that is safe so that injury does not occur if there is an accidental discharge of a shotgun or rifle; for keeping the shotguns or rifles from getting wet if there is water in the bottom of the boat; for providing a shotgun or rifle mount that does not interfere with the hunter when the shotgun or rifle is removed from the mount and in use; and for securing the shotgun or rifle to the boat so that the shotgun or rifle is not lost if the boat capsizes or is bumped into while traveling across the water. However, there are no gun mounts currently in use that provide these functions.

U.S. Pat. No. 3,876,078, issued Apr. 8, 1975, and entitled "Portable Gun Rack" discloses a portable gun rack for mounting a gun in duck blinds, deer stands and the like. While suitable for mounting guns in duck blinds, deer stands and the like, the portable gun rack of the '078 patent is not suitable for mounting a gun in a shallow hunting boat. With the portable gun rack of the '078 patent receiving the butt end of the stock and the forward end portion of the gun stock to hold the gun in the rack, as shown in FIG. 1, and with the clamp for securing the rack to a duck blind or deer stand located at the upper end of the gun rack, the height of the portable gun rack of the '078 would be to great for mounting shotgun or rifle within a shallow hunting boat.

U.S. Pat. No. 3,952,878, issued Apr. 27, 1976, entitled "Gun Stand" discloses a portable gun stand to be mounted in the ground which engages the rifle at the butt end of the stock and near the forward end of the barrel. U.S. Pat. No. 4,089,423, issued May 16, 1978, and entitled "Rifle Stand" discloses a gun stand to be mounted in the ground which engages the butt end of the stock and a midportion of the stock. U.S. Pat. No. 4,144,971, issued Mar. 20, 1979, and entitled "Gun Caddy" discloses a gun stand to be mounted in the ground which engages the butt end of the stock and the barrel of the shotgun. U.S. Pat. No. 4,159,588, issued Jul. 3, 1979, and entitled "Apparatus for Supporting Sporting Guns During Testing Intervals" discloses a frame for supporting a gun in a downward inclined position and for cooling the gun barrel. U.S. Pat. No. 5,078,279, issued Jan. 7, 1992, and entitled "Gun Rack" discloses a gun rack to be attached to vertical surfaces which holds the gun in a horizontal position. U.K. patent application 2170994 A, published Aug. 20, 1986, and entitled "Gun Security Systems", discloses a lockable gun rack, to be attached to a vertical surface, which engages the gun at the butt end of the stock, at a midportion of the stock rearward of the trigger guard, and at the forward end of the barrel.

SUMMARY OF THE INVENTION

The vertical shotgun or rifle mount of the present invention, for hunting boats and the like, includes a mounting bracket for holding a shotgun or rifle in a substantially vertical position with the muzzle of the shotgun or rifle pointing upward. The mounting bracket includes a first firearm retainer adjacent the base of the mounting bracket for receiving and holding the butt end of a shotgun or rifle stock and maintaining the butt end of the shotgun or rifle stock above the bottom of a boat and a second firearm retainer adjacent the upper end of the mounting bracket for receiving and holding the receiver of a shotgun or rifle. As used herein the term "receiver" means the metal frame in which the mechanism by means of which the shotgun or rifle is loaded and fired is fitted and to which the breech end of the barrel(s) is attached. Preferably, the second firearm retainer grips the receiver at or immediately forward of the trigger guard.

The mounting bracket has a clamp or other securement device for securing the mounting bracket to the side of a hunting boat and preferably, to the gunnel of the hunting boat. The clamp or other securement device is located on the mounting bracket, intermediate the first and second firearm retainers for receiving and holding the shotgun or rifle, at a midportion of the mounting bracket. With this location of the clamp or other securement device relative to the first and second firearm retainers and with the first firearm retainer receiving and holding the butt end of the shotgun or rifle stock and the second firearm retainer receiving and holding the receiver of the shotgun or rifle, the base of the mounting bracket is spaced above the bottom of the hunting boat to keep the stock of the shotgun or rifle dry and the upper end of the mounting bracket projects above the gunnel of the hunting boat less than twelve inches (preferably about seven inches) so that the mounting bracket does not interfere with the movement of the shotgun or rifle by the hunter after the hunter removes the shotgun or rifle from the mounting bracket.

BRIEF DESCRIPTION OF THE DRAWINGS

FIG. 1 is a front vertical view of the vertical mounting bracket of the present invention.

FIG. 2 is a top view of the vertical mounting bracket shown in FIG. 1.

DESCRIPTION OF THE PREFERRED EMBODIMENTS

Figure 3:
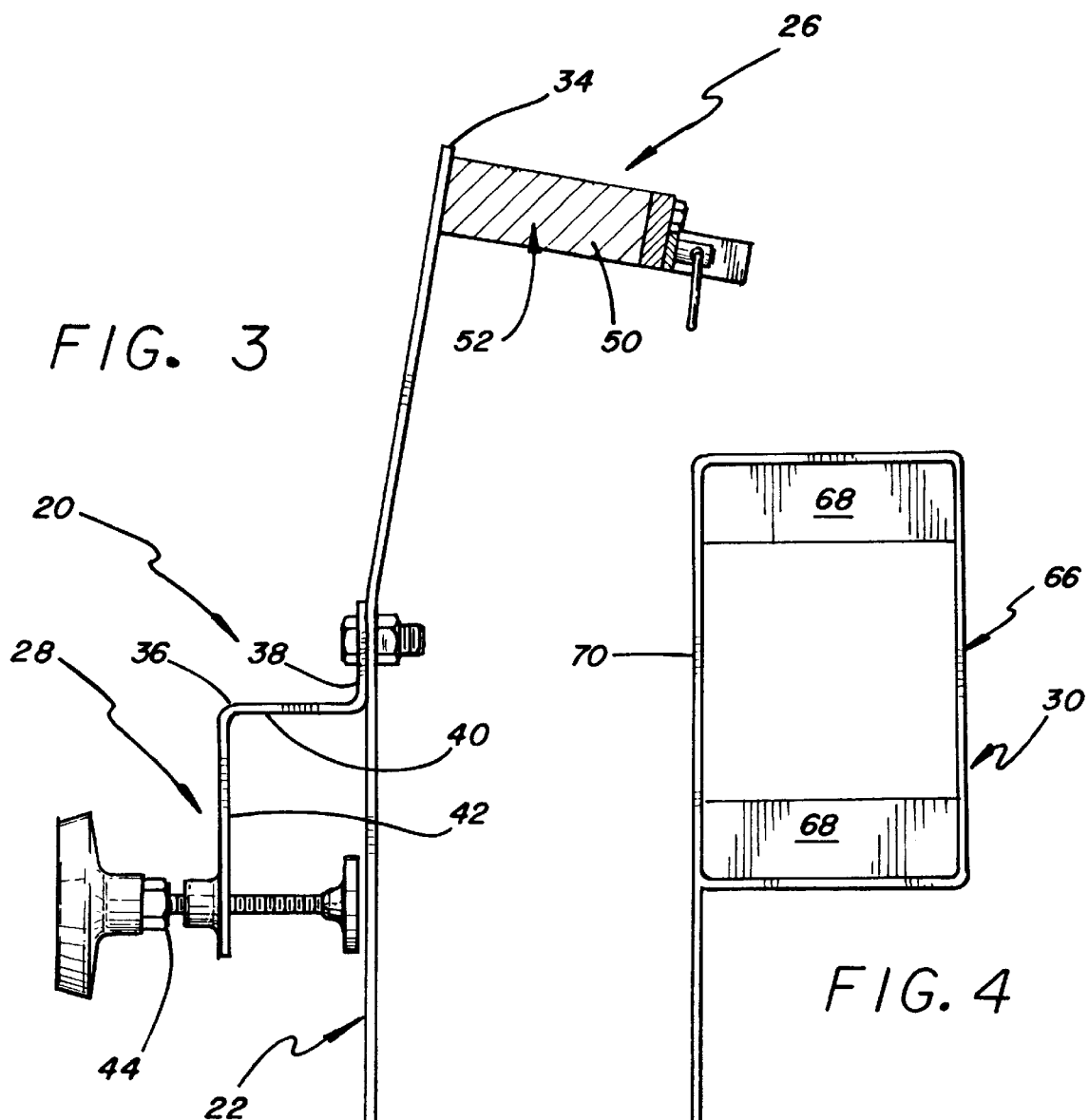
FIG. 3 is a side view of the vertical mounting bracket shown in FIG. 1.
Figure 5:
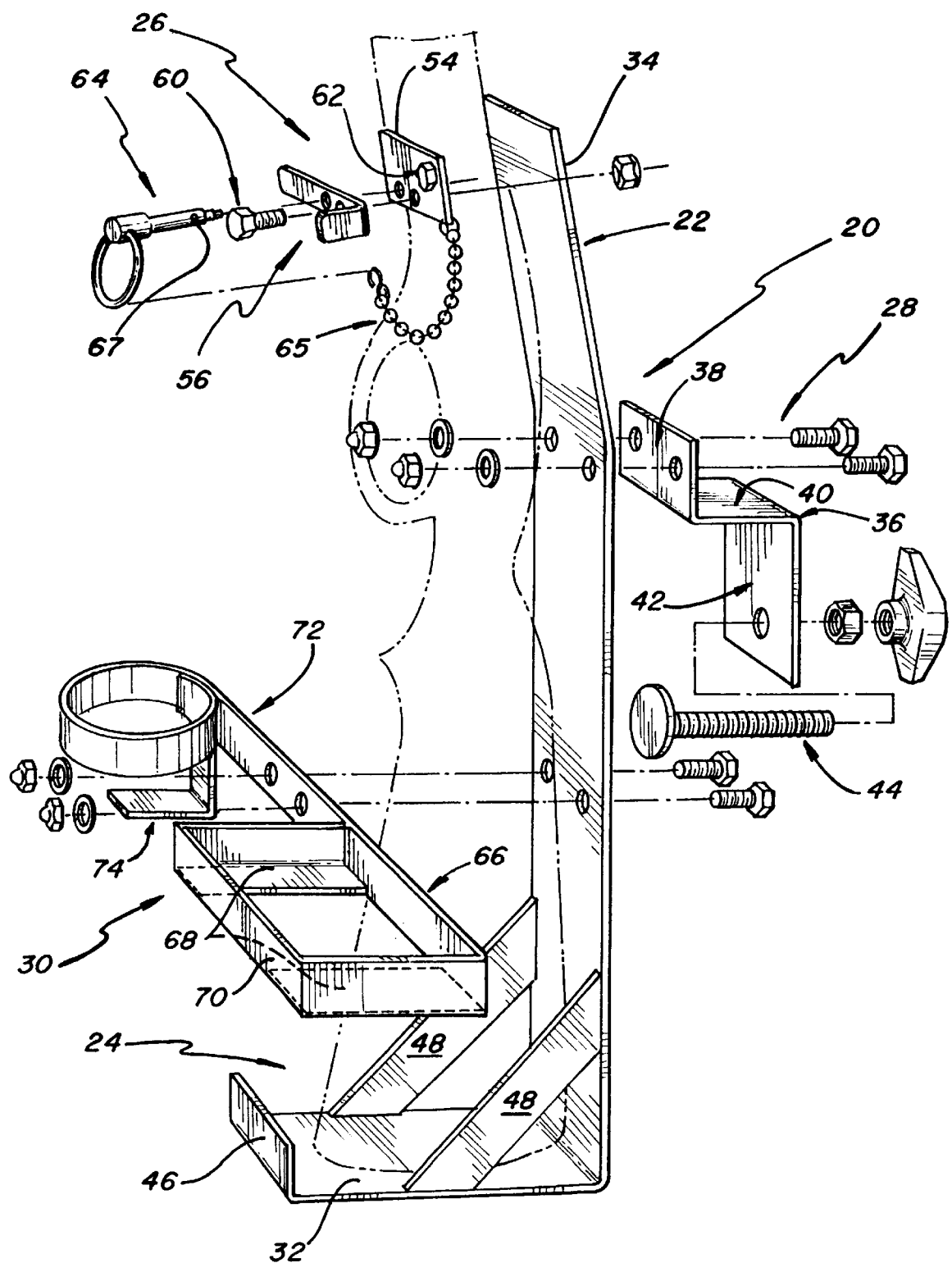
FIG. 5 is an exploded perspective view of the vertical mounting bracket of FIG. 1 with a shotgun or rifle, shown in phantom line, mounted in the mounting bracket.

As shown in FIGS. 1, 3 and 5, the vertical shotgun or rifle mount 20 of the present invention includes a vertically extending mounting bracket 22; a first firearm retainer 24 for receiving and retaining the butt end of a shotgun or rifle; a second firearm retainer 26 for receiving and retaining the receiver of a shotgun or rifle; a securement device 28 for securing the mounting bracket 22 to the side of a hunting boat; and an ammunition and cup holder 30. The vertical shotgun and rifle mount 20 is made of a metal, such as but not limited to, steel, stainless steel and aluminum or a strong, durable polymeric material. The vertical height of the shotgun or rifle mount 20 from the base plate 32 of the mounting bracket 22 to the upper end 34 of the mounting bracket 22 is twenty four inches or less, preferably between about sixteen and about twenty inches, and most preferably about eighteen inches.

As shown in FIGS. 3 and 5, the securement device 28 for securing the mounting bracket 22 to the side of a hunting boat, in its preferred form, is a clamp. The clamp includes a clamp frame 36 with a first generally vertically extending section 38 for securing the clamp to the mounting bracket 22, a generally horizontally extending section 40 for passing over and engaging the upper surface of the boat gunnel, and a second generally vertically extending section 42, spaced from the opposing surface of the mounting bracket 22, for extending down adjacent the outside surface of the hunting boat sidewall and carrying a clamp screw 44 for clamping the mounting bracket 22 to the side of the hunting boat. The generally horizontally extending section 40 of the clamp frame 36 of the securement device 28 which passes over the gunnel of the hunting boat to position the mounting bracket 22 vertically with respect to the side of hunting boat is located about thirteen inches or less above the base plate 32 of the mounting bracket and about twelve inches or less below the upper end 34 of the mounting bracket 22. Preferably, the generally horizontally extending section 40 of the clamp frame 36 is located between about ten inches and about twelve inches above the base plate 32 of the mounting bracket 22 and between about four inches and about ten inches below the upper end 34 of the mounting bracket 22, and most preferably, about eleven inches above the base plate 32 of the mounting bracket 22 and about seven inches below the upper end 34 of the mounting bracket 22. As will be discussed more fully hereinafter, with this location of the clamp or other securement device 28 relative to the first and second firearm retainers 24, 26 and with the first firearm retainer 24 receiving and holding the butt end of the shotgun or rifle stock and the second firearm retainer 26 receiving and holding the receiver portion of the shotgun or rifle, the base 32 of the mounting bracket 22 is spaced above the bottom of the hunting boat to keep the stock of the shotgun or rifle dry and the upper end 34 of the mounting bracket 22 projects above the gunnel the hunting boat less than twelve inches and most preferably only about seven inches so that the mounting bracket 22 does not interfere with the movement of the shotgun or rifle by the hunter after removing the shotgun or rifle from the mounting bracket 22.

As shown in FIGS. 1, 3 and 5, the first firearm retainer 24 includes the base plate 32 which has an upstanding flange 46 at its outer end and a pair of reinforcement or gusset plates 48 which together with the base plate 32 and the flange 46 form a pocket for receiving and retaining the butt end of a shotgun or rifle stock as shown in phantom line in FIG. 5. Preferably, the first firearm retainer 24 is covered with a fabric, rubber or some other conventional padding 50, represented by the cross hatching on the first firearm retainer in FIGS. 1 and 3, to keep the gun stock from being scratched or otherwise damaged while in the retainer or being placed in or removed from the retainer.

As shown in FIGS. 1, 2, 3 and 5 the second firearm retainer 26, which is located at or adjacent the upper end 34 of the mounting bracket 22 includes a generally channel shaped member 52, with a flange 54 projecting from one side, and a locking mechanism 56, e.g. a pivoting latch lever 58, which can be closed to lock the receiver portion of a shotgun or rifle within the second firearm retainer 26 or pivoted open to permit the receiver portion of a shotgun or rifle to be placed in or removed from the second firearm retainer. The channel shaped member is welded or otherwise firmly and securely affixed to the upper end 34 of the mounting bracket 22, sized to accommodate the receiver of a shotgun or rifle, and preferably, along with pivoting latch lever 58, is covered with a fabric, rubber or some other conventional padding 50, represented by the cross hatching on the second firearm retainer in FIGS. 1 and 3, to keep the receiver of a shotgun or rifle from being scratched or otherwise damaged while in the retainer or being placed in or removed from the retainer. As shown, the pivoting latch lever 58 of the locking mechanism 56 is pivotally mounted on the flange 54 by a bolt and nut assembly 60 so that the latch lever 58 can be pivoted from a substantially vertical or open position to a horizontal or closed position to close the mouth or open end of the channel shaped member 52. In the closed position, the rear portion of the latch lever 58 engages a stop 62 which maintains the latch lever in the horizontal position and a pin 64, attached to the flange 54 by a chain 65 and having a hole 67 for receiving a cotter pin or the like, is passed through aligned holes in the latch lever 58 and the flange 54 to lock the latch lever 58 in its horizontal position closing off the mouth or open end of the channel shaped member 52 to lock the receiver of a shotgun or rifle, shown in phantom line in FIG. 5, in the second firearm retainer 26. While there has to be some leeway or tolerance to accommodate shotguns or rifles varying somewhat in length between the receiver and the butt end of the stock, preferably, the second firearm retainer engages the receiver of the shotgun or rifle at or immediately forward of the trigger guard of the shotgun or rifle, as shown in phantom line in FIG. 5, to keep the height of the mounting bracket as short as practical.

As shown in FIGS. 3 and 5, the vertical section 38 of the clamp frame 36 is bolted or otherwise firmly and securely affixed to the mounting bracket 22. The horizontally extending section 40 has a length, e.g. between about 1½ and about 2½ inches, to permit the clamp frame 36 to pass over the gunnel of a hunting boat so that the clamp screw 44 can clear the gunnel and then be threaded inward to engage the side of the boat and clamp the mounting bracket 22 to the side of the boat. As shown in FIG. 3, to keep the shotgun or rifle oriented in a more vertical position, the upper portion of the mounting bracket 22 above the clamp frame 36, preferably, is inclined at an angle of about 10° relative to the lower portion of the mounting bracket.

With the clamp or other securement device 28 located relative to the first and second firearm retainers 24 and 26 as set forth above, and with the first firearm retainer 24 receiving and holding the butt end of the shotgun or rifle stock and the second firearm retainer 26 receiving and holding the receiver of the shotgun or rifle, the base of the mounting bracket is spaced above the bottom of the hunting boat to keep the stock of the shotgun or rifle dry and the upper end of the mounting bracket projects above the gunnel the hunting boat less than twelve inches, preferably only about seven inches, so that the mounting bracket does not interfere with the movement of the shotgun or rifle by the hunter when hunting after removing the shotgun or rifle from the mounting bracket 22.

Figure 4:
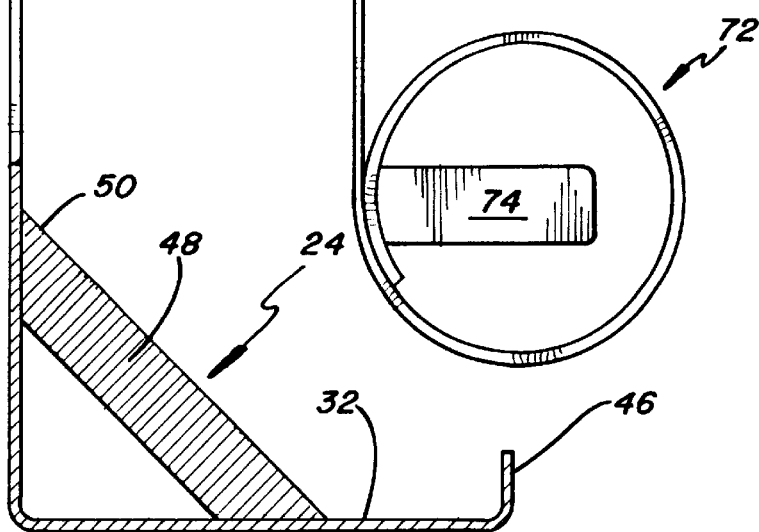
FIG. 4 is a plan view of the ammunition box and cup holder which can be incorporated into the vertical mounting bracket shown in FIG. 1.

In a preferred form of the invention, the shotgun and rifle mount 20 is also provided with an ammunition and cup holder, such as the ammunition and cup holder 30 shown in FIGS. 1, 4 and 5. The ammunition and cup holder 30 is bolted or otherwise firmly and securely affixed to the mounting bracket, typically about six to eight inches above the base of the mounting bracket 22. As shown in FIGS. 1, 4 and 5, the ammunition box and cup holder 30 has a rectangular box holder 66 with floor sections 68 and a peripheral upstanding flange 70 and a circular cup holder 72, for receiving a cup or thermos, with a bottom engaging member 74 for engaging the bottom of a cup or thermos.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A vertical shotgun or rifle mount for hunting boats and the like, comprising:

mounting bracket means for holding a shotgun or rifle in a substantially vertical position with a muzzle of the shotgun or rifle pointing upward; the mounting bracket means including a first retaining means adjacent a base of the mounting bracket means for receiving and holding the butt end of a shotgun or rifle stock and maintaining the butt end of the shotgun or rifle stock above the bottom of a boat; the mounting bracket means including a second retaining means adjacent an upper end of the mounting bracket means for receiving and holding the receiver of a shotgun or rifle; and securement means located intermediate the base and the upper end of the mounting bracket means for securing the mounting bracket means to the side of a hunting boat with the base of the mounting bracket means less than thirteen inches below the securement means to keep the base of mounting bracket means above the bottom of a hunting boat to which the mounting bracket means is attached and with the upper end of the mounting bracket means less than twelve inches above the securement means to keep the upper end of the mounting bracket means from projecting more than twelve inches above a gunnel of a hunting boat to which the mounting bracket means is attached.

2. The vertical shotgun or rifle mount according to claim 1, wherein: the second retaining means includes a locking means for preventing the receiver portion of the shotgun or rifle from being removed from the second retaining means without first unlocking the locking means.

3. The vertical shotgun or rifle mount according to claim 2, wherein: the second retaining means is channel shaped with an open side for inserting the receiver of the shotgun or rifle into and removing the receiver of the shotgun or rifle from the second retaining means and the locking means is a flip lever that closes the open side of the second retaining means in a first locked position and opens the open side of the second retaining means in a second unlocked position.

4. The vertical shotgun or rifle mount according to claim 1, wherein: the securement means for securing the mounting bracket means to the side of a hunting boat with the base of the mounting bracket means above the bottom of the hunting boat and the upper end of the mounting bracket means projecting above a gunnel of the side of the hunting boat less than twelve inches is a clamp for releasably clamping the mounting bracket means to the gunnel of the side of the hunting boat.

5. The vertical shotgun or rifle mount according to claim 4, wherein: the mounting bracket means is between about sixteen inches and about twenty inches in height; the clamp is located between about ten inches and about twelve inches from the base of the mounting bracket means; and the upper end of the mounting bracket means extends above the clamp between about four inches and about ten inches.

6. The vertical shotgun or rifle mount according to claim 1, including: an ammunition box and cup holder means secured to the mounting bracket means intermediate the base and the upper end of the mounting bracket means.

7. A vertical shotgun or rifle mount for hunting boats and the like, comprising:

mounting bracket means for holding a shotgun or rifle;

the mounting bracket means including a first retaining means adjacent a base of the mounting bracket means for receiving and holding the butt end of a shotgun or rifle stock and maintaining the butt end of the shotgun or rifle stock above the bottom of a boat;

the mounting bracket means including a second retaining means adjacent an upper end of the mounting bracket means for receiving and holding the receiver of a shotgun or rifle at or immediately forward of the trigger guard of the shotgun or rifle; the second retaining means being channel shaped with an open side for inserting the receiver of the shotgun or rifle into and removing the receiver of the shotgun or rifle from the second retaining means and including a flip lever that closes the open side of the second retaining means in a first locked position and opens the open side of the second retaining means in a second unlocked position; and a securement means located intermediate the base and the upper end of the mounting bracket means for securing the mounting bracket means to the side of a hunting boat with the base of the mounting bracket means less than thirteen inches below the securement means to keep the base of the mounting bracket means above the bottom of the hunting boat to which the mounting bracket is attached and with the upper end of the mounting bracket means less than twelve inches above the securement means to keep the upper end of the mounting bracket means from projecting more than twelve inches above a gunnel a hunting boat to which the mounting bracket is attached; the securement means being a clamp for releasably clamping the mounting bracket means to the gunnel of the side of the hunting boat.

8. The vertical shotgun or rifle mount according to claim 7, wherein: the mounting bracket means is between about sixteen inches and about twenty inches in height; the clamp is located between about ten inches and about twelve inches from the base of the mounting bracket means; and the upper end of the mounting bracket means extends above the clamp between about four inches and about ten inches.

9. The vertical shotgun or rifle mount according to claim 7, wherein: the mounting bracket is about eighteen inches in height, the clamp is located about eleven inches above the base of the mounting bracket means, and the upper end of the mounting bracket means extends above the clamp about seven inches.

10. The vertical shotgun or rifle mount according to claim 7, including: an ammunition box and cup holder means secured to the mounting bracket means intermediate the base and the upper end of the mounting bracket means.

* * * * *